US009670007B2

(12) United States Patent
Beesley et al.

(10) Patent No.: US 9,670,007 B2
(45) Date of Patent: Jun. 6, 2017

(54) ACCUMULATING DEVICE

(71) Applicant: Illinois Tool Works Inc., Glenview, IL (US)

(72) Inventors: Robert C. Beesley, Greenville, SC (US); Mark Nunn, Simpsonville, SC (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/075,331

(22) Filed: Mar. 21, 2016

(65) Prior Publication Data

US 2016/0340129 A1    Nov. 24, 2016

Related U.S. Application Data

(60) Provisional application No. 62/164,112, filed on May 20, 2015.

(51) Int. Cl.
| | |
|---|---|
| *B65G 1/00* | (2006.01) |
| *B65G 47/00* | (2006.01) |
| *B65G 47/26* | (2006.01) |
| *B65G 47/51* | (2006.01) |
| *B65G 47/68* | (2006.01) |
| *B65G 15/12* | (2006.01) |
| *B65G 47/14* | (2006.01) |
| *B65G 47/31* | (2006.01) |

(52) U.S. Cl.
CPC ........... *B65G 47/261* (2013.01); *B65G 15/12* (2013.01); *B65G 47/1492* (2013.01); *B65G 47/5131* (2013.01); *B65G 47/682* (2013.01); *B65G 47/31* (2013.01); *B65G 2201/0235* (2013.01)

(58) Field of Classification Search
CPC .......... B65G 1/00; B65G 47/00; B65G 47/66; B65G 47/5131
USPC .................... 198/347.1, 347.4, 442, 452, 453
See application file for complete search history.

(56) References Cited

U.S. PATENT DOCUMENTS

| | | | | |
|---|---|---|---|---|
| 3,866,739 A | * | 2/1975 | Sikorski ............... | B65G 47/682 198/453 |
| 4,976,343 A | * | 12/1990 | Fuller .................. | B65G 47/682 198/453 |
| 5,551,551 A | | 9/1996 | Crawford | |

(Continued)

FOREIGN PATENT DOCUMENTS

| | | |
|---|---|---|
| DE | 10 2007 034519 | 1/2009 |
| FR | 2887533 | 12/2006 |

OTHER PUBLICATIONS

International Search Report for PCT/US2016/033167, dated Aug. 8, 2016.

*Primary Examiner* — James R Bidwell
(74) *Attorney, Agent, or Firm* — JK Intellectual Property Law, PA

(57) ABSTRACT

A device for accumulating articles within a system may include a frame, a mass-flow infeed conveyor supported by the frame for receiving articles from the system, and a mass-flow outfeed conveyor supported by the frame for receiving articles from the infeed conveyor and returning the articles to the system. A single-filing device is supported by the frame and includes a plurality of parallel endless loop conveyors. The endless loop conveyors each have an upstream end located laterally from and between upstream and downstream ends of the infeed conveyor.

27 Claims, 4 Drawing Sheets

(56) References Cited

U.S. PATENT DOCUMENTS

| | | | |
|---|---|---|---|
| 6,328,151 B1 | 12/2001 | Spangenberg | |
| 7,028,830 B2 | 4/2006 | Beesley et al. | |
| 7,086,520 B2 | 8/2006 | Monte | |
| 7,198,147 B2 | 4/2007 | Petrovic | |
| 7,222,718 B2* | 5/2007 | Tarlton | B65G 47/684 198/347.4 |
| 7,926,642 B2 | 4/2011 | Hüttner et al. | |
| 8,220,615 B2* | 7/2012 | Petrovic | B65G 47/682 198/452 |
| 8,534,451 B2 | 9/2013 | Damen et al. | |
| 8,573,380 B2* | 11/2013 | Petrovic | B65G 47/5131 198/347.1 |
| 8,997,970 B2 | 4/2015 | Ehmer et al. | |

\* cited by examiner

ACCUMULATING DEVICE

This application is a United States Non-Provisional Patent Application, claiming benefit to U.S. Provisional Patent Application Ser. No. 62/164,112, filed May 20, 2015 which is incorporated by reference herein.

TECHNICAL FIELD

The present disclosure relates generally to a device for accumulating articles within a system, and more particularly relates to a mass-flow accumulating device with an integrated single-file output.

BACKGROUND

There are many arrangements wherein conveyors buffer flow of articles through a system. One common use is in systems for filling liquid containers such as bottles, cans or boxes. In such systems, to achieve first-in/first-out flow, an accumulator with oppositely-running conveyors can be located between an upstream station (e.g., a filler) and a downstream station (e.g. a capper). The conveyors may be straight and horizontal, and may be in the form of "mass-flow, linear" conveyors. Alternatively, the conveyors may be curved and non-horizontal, and may be in the form of "single-file, helical" conveyors. One of the conveyors (e.g., an infeed conveyor) receives articles from the system and the other conveyor (e.g., an outfeed conveyor) returns articles to the system. A transfer device moves articles from the infeed conveyor to the outfeed conveyor. Articles thus flow from the system, through the infeed conveyor, transfer device, and outfeed conveyor, and then back to the system.

When the upstream and downstream stations run at the same speed (in terms of articles per minute, for example), the accumulator generally operates in a steady state. When the infeed and outfeed conveyors are moved at the same speed the transfer device is stationary. If the downstream station slows or stops, the device leaves steady state. The outfeed conveyor slows or stops accordingly, while the infeed conveyor continues and the transfer device moves so that more articles enter the accumulator. As long as the downstream station returns to service before the accumulator is filled, then the overall system need not be stopped or slowed. Similarly, if the upstream device slows or stops, the infeed conveyor slows or stops accordingly, and the outfeed conveyor continues at full speed as long as a supply of articles is available in the accumulator. As long as the upstream device returns to service before the accumulator is emptied, then the overall system need not be stopped or slowed.

Many of such accumulator devices have been successfully deployed. In particular, Applicant has commercially introduced, and is owner of U.S. patents on, various types of mass-flow and single file accumulators under the DYNAC® name. For example, U.S. Pat. Nos. 6,382,398 and 6,497,321 disclose respectively horizontal, mass-flow and helical, single-file accumulators. These patents are incorporated by reference herein.

The devices and systems introduced by Applicant and disclosed in the above patents provide exemplary operation in their intended systems. Further, available floorspace, customer preference and/or the particular type (or types) of articles to be handled by a given system may dictate which of the above types of accumulators might be employed. However, no available system provides the high capacity/ easy reach benefits of a horizontal, mass-flow system and the secure handling/reduced floorspace of helical, single-file systems.

Therefore, further improvement in accumulator devices and systems would be welcome, in particular in providing one or more of designs for first-in/first-out accumulators, having high capacity, a single file output, and/or an efficient floorspace arrangement, as well as other advantages.

SUMMARY

Aspects and advantages of the disclosed subject matter will be set forth in part in the following description, or may be obvious from the description, or may be learned through practice of the disclosed subject matter.

According to certain aspects of the disclosure, a device for accumulating articles within a system may include a frame, an infeed conveyor supported by the frame for receiving articles from the system, the infeed conveyor being a mass-flow conveyor drivable in a first direction, and an outfeed conveyor supported by the frame for receiving articles from the infeed conveyor and returning the articles to the system, the outfeed conveyor being a mass-flow conveyor drivable in a second direction opposite the first direction. A transfer device is supported by the frame for transferring articles from the infeed conveyor to the outfeed conveyor, the transfer device moveable along the infeed and outfeed conveyors depending on flow through the system. At least two endless loops are mounted in parallel to each other and to the outfeed conveyor on the frame and are drivable independently. An outermost one of the endless loops furthest from the infeed conveyor is drivable at a speed higher than any other of the endless loops so that the outermost endless loop returns articles to the system in single file orientation. Various options and modifications are possible.

For example, the infeed conveyor may have a width greater than a width of the outfeed conveyor. Also, when the device is in a steady state condition, the outfeed conveyor may be driven faster than the infeed conveyor. The ratio of a speed of the outfeed conveyor to a speed of the infeed conveyor speed may be substantially equal to the ratio of a width of the infeed conveyor to a width of the outfeed conveyor.

The transfer device may be movable via a motor or by via output of a differential gearbox having inputs related to the speeds of the infeed conveyor and the outfeed conveyor.

The device may include at least four of the endless loops. Each of the endless loops may be drivable with a respective speed that increases in a direction from an innermost one of the endless loops to the outermost endless loop. The innermost endless loop may be drivable at a speed that is higher than a speed of the outfeed conveyor. Each given endless loop outward of the innermost endless loop may be drivable at a speed that is about 10% higher than a speed of the endless loop immediately inward of the given endless loop. The outermost endless loop may be drivable at a speed that is about twice that of a speed of the outfeed conveyor. A first portion of the frame supporting the endless loops may be pivotable along an axis extending along the endless loops relative to a second portion of the frame supporting the outfeed conveyor so as to pivot upper surfaces of the endless loops from the horizontal around the axis.

A guide member may be attached to the frame for guiding articles from the outfeed conveyor toward the endless loops. The infeed conveyor may have an upstream end and a downstream end, each of the endless loops having a respective upstream end located laterally from and between the upstream and downstream ends of the infeed conveyor.

According to certain other aspects of the disclosure, a device for accumulating articles within a system may include a frame, an infeed conveyor supported by the frame for receiving articles from the system, the infeed conveyor being a mass-flow conveyor having and upstream end and a downstream end and being drivable in a first direction, and an outfeed conveyor supported by the frame for receiving articles from the infeed conveyor and returning the articles to the system, the outfeed conveyor being a mass-flow conveyor drivable in a second direction opposite the first direction. A transfer device is supported by the frame for transferring articles from the infeed conveyor to the outfeed conveyor. A single-filing device is supported by the frame and includes a plurality of parallel endless loop conveyors including a first conveyor adjacent the outfeed conveyor and an exit conveyor furthest from the outfeed conveyor. The endless loop conveyors each are drivable at a speed, the first conveyor being drivable at a speed higher than a speed of the outfeed conveyor, and each endless loop conveyor laterally outward of the first conveyor being drivable at a speed higher than a speed of the endless loop conveyor immediately laterally inward. The endless loop conveyors each have an upstream end located laterally from and between the upstream and downstream ends of the infeed conveyor. The single filing device receiving a mass flow of articles from the outfeed conveyor and converts the mass flow to a single-file flow of articles on the exit conveyor for return to the system. Various options and modifications are possible.

For example, the infeed conveyor may have a width greater than a width of the outfeed conveyor, and the ratio of the outfeed conveyor speed to the infeed conveyor speed may be substantially equal to the ratio of the outfeed conveyor width to the infeed conveyor width.

Also, the transfer device may be movable along the infeed and outfeed conveyors depending on a variation in flow of articles through the system. A guide member may be attached to the frame for guiding articles from the outfeed conveyor toward the endless loops.

At least four of the endless loops may be provided, and each of the endless loops may be drivable with a respective speed that increases in a direction from an innermost one of the endless loops to the outermost endless loop. Each given endless loop outward of the innermost endless loop may be drivable at a speed that is about 10% higher than a speed of the endless loop immediately inward of the given endless loop. A first portion of the frame supporting the endless loop conveyors may be pivotable along an axis extending along the endless loop conveyors relative to a second portion of the frame supporting the outfeed conveyor so as to pivot upper surfaces of the endless loop conveyors from the horizontal around the axis.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
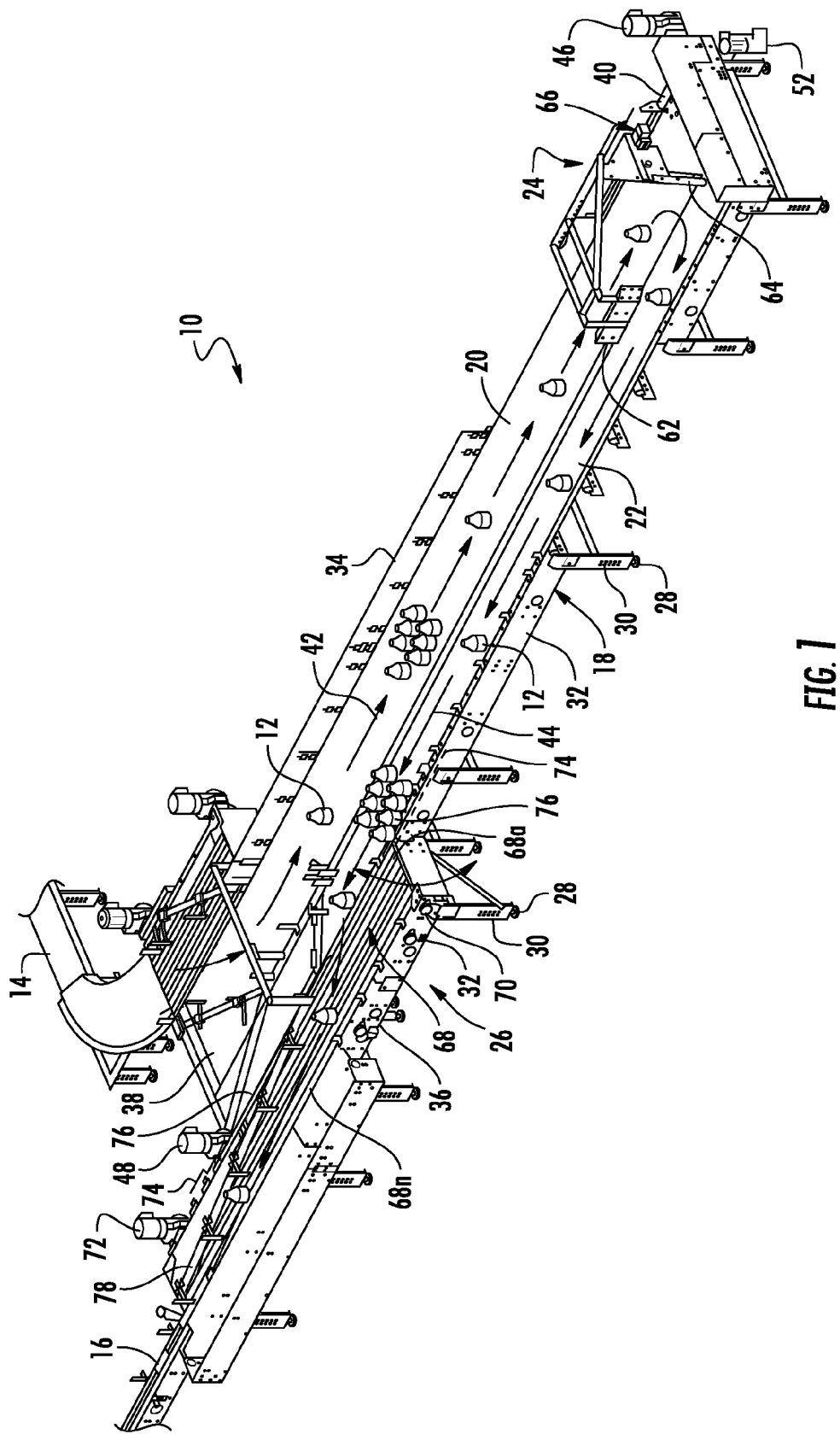
FIG. 1 is a perspective view of an example of a device for accumulating articles within a system, according to certain aspects of the present disclosure.
Figure 2:
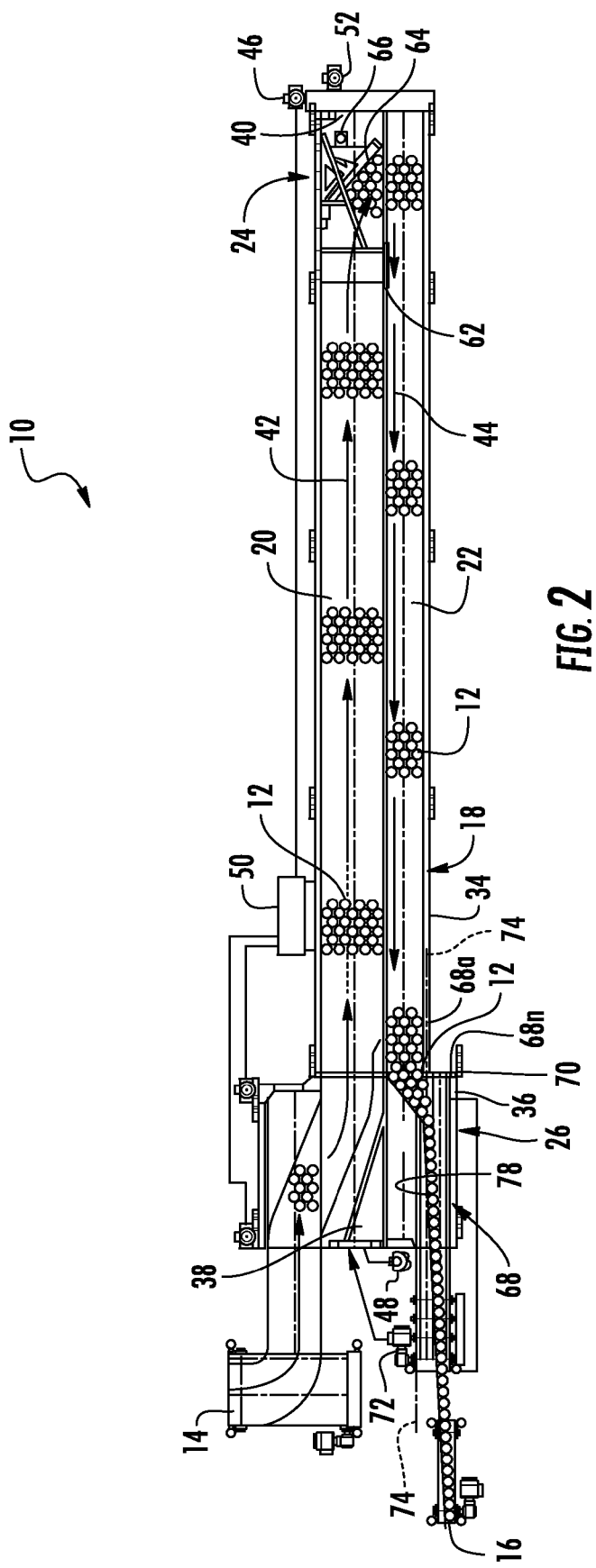
FIG. 2 is a top view of the device as in FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally speaking, FIGS. 1-4 show a device 10 for accumulating articles 12 within a system. The system may include an upstream conveyor 14 and a downstream conveyor 16. Alternately, if desired, conveyors 14, 16 may be replaced by a single conveyor (not shown) that supplies articles to and receives articles from device 10. The system can be, for example a container handling system for bottles, boxes, etc., including one or more upstream and downstream stations. The present disclosure is thus not limited to any particular conveying system and has application in any system wherein flow of articles is to be buffered between an upstream station and a downstream station.

Device 10 includes generally a frame 18 which supports an infeed conveyor 20, an outfeed conveyor 22, a transfer device 24 and a single filing device 26. As shown, frame 18 includes numerous elements attached together, including feet 28, uprights 30 and cross pieces 32. The elements 28, 30, 32 of frame 18 may be formed separately, for example of steel, and welded together or attached together by fasteners. A first portion 34 of frame 18 supports infeed conveyor 20, outfeed conveyor 22 and transfer device 24. A second portion 36 of frame 18 supports the single filing device 26. Frame 18 should be strong enough to support the other components above and a load of articles.

Infeed conveyor 20 receives articles from the system and stores them before passing them back to the system. Infeed conveyor 20 is a mass-flow conveyor having an upstream end 38 and a downstream end 40. Infeed conveyor 20 is drivable in a first direction 42 toward downstream end 40.

Outfeed conveyor 22 receives articles from infeed conveyor 20 and returns the articles to the system. Outfeed conveyor 22 is also a mass-flow conveyor, and it is drivable in a second direction 44 opposite first direction 42.

Transfer device 24 transfers articles from infeed conveyor 20 to outfeed conveyor 22. Transfer device 24 is movably mounted to frame 18 so as to be able to move back and forth in first direction 42 or second direction 44 based on flow through device 10 and the overall system. In a steady state (full-speed operational) situation in system, infeed conveyor 20 and outfeed conveyor 22 each run at a respective steady state speed (discussed below), and transfer device 24 does not move along the conveyors.

If a downstream station slows or stops, then outfeed conveyor 22 will slow or stop accordingly, and transfer device 24 will move in first direction 42 so device 10 can hold more articles on both infeed conveyor 20 and outfeed conveyor 22. If transfer device 24 reaches its limit of travel in first direction 42 before the downstream station recovers to steady state throughput, then the upstream station will have to also be stopped or slowed accordingly.

Similarly, if an upstream station slows or stops, then infeed conveyor 20 will slow or stop accordingly, and transfer device 24 will move in second direction 44 so device 10 can continue to deliver articles from infeed conveyor 20 and outfeed conveyor 22. If transfer device 24 reaches its limit of travel in second direction 44 before the upstream station recovers to steady state throughput, then the downstream station will have to also be stopped or slowed accordingly.

Conventional motors and control systems may be provided to operate the system and device 10. For example, infeed conveyor 20 is driven by a motor 46 and outfeed conveyor 22 is driven by a motor 48. Contact, optical, acoustic, or other sensors (not shown) may be provided throughout the system and device 10 to detect volume and speed of flow of articles, positioning of articles or elements of device 10 or parts of the system, etc. A programmable logic controller 50, such as is sold by Allen-Bradley, may be employed to control elements of device 10. Code and algorithms may be provided to control various aspects of the functioning of the device, as desired for a given application. Accordingly, those skilled in the art can design a control system using controller 50 to run device 10, as desired.

Optionally, infeed conveyor 20 may have a width greater than that of outfeed conveyor 22. If so, the number of articles that would be storable on a given linear foot of the conveyors would be proportional to the ratio of their widths (actual conveyed product width, not full conveyor width). Thus, if infeed conveyor 20 were 3 times the width of outfeed conveyor 22, then the infeed conveyor would hold 3 times as many articles as the outfeed conveyor. Also, in a steady state condition (where transfer device 24 is stationary), the speeds of conveyors 20 and 22 would be inversely proportional. Thus, for the infeed and outfeed conveyors 20, 22 at a 3 to 1 width ratio as above, the outfeed conveyor would run at a speed three times that of infeed conveyor.

Use of a wider infeed conveyor 20 as compared to outfeed conveyor 22 provides certain advantages. For example, it may allow for easier thinning of flow by single filing device 26 if the flow on outfeed conveyor 22 is only one-fourth the total flow on the infeed and outfeed conveyors collectively. In other words, it may be easier to thin an already thinner flow. Second, by running outfeed conveyor 22 at a speed faster than that of infeed conveyor 20, or even the average speed of the two, separation of the flow on outfeed conveyor 22 to a single-file flow is easier. This is so because such is accomplished via a series of faster-moving conveyors (discussed below), and having a step-up in speed at outfeed conveyor 22 assists in thinning the flow.

Transfer device 24 may be of various designs. For example, transfer device 24 can be driven in the first and second direction 42, 44 either by a motor 52 (such as a servo-motor) controlled by controller 50, or by a differential gear arrangement 54 (shown schematically). If a motor 52 is used, inputs to controller 50 as noted above can be used to generate signals within the controller that can be transmitted to the motor to thereby drive transfer device 24 back and forth in first and second direction 42, 44 as needed due to flow of articles through the system. An endless loop, conveyor, cable or the like 56 connected to transfer device 24 and driven by an output of motor 52 may be mounted along frame 18 to move transfer device 24 back and forth.

If a differential gear solution is employed, mechanical inputs based on the speeds of infeed and outfeed conveyors 20, 22 can be directed to the differential gear assembly 54. The differential gear assembly 54 would also drive an endless loop, conveyor, cable or the like 56 as above at a speed and in a direction based on the flow of articles through the system. Intermediate gearing 58 (infeed side) and 60 (outfeed side) may be provided. Intermediate gearing 58, 60 may between them account for any conveyor width and steady state speed differential before transmission of rotation to differential gear assembly 54.

For example, if the infeed:outfeed width ratio is 3:1, then a ratio of gearing 58:60 may account for such difference so that differential gear assembly 54 is at steady state (does not provide an output causing transfer device 24 to move via loop 56) when the outfeed:infeed speed ratio is at 3:1. Accordingly, at steady state, gearing 58,60 would cause differential gear assembly 54 to receive equal speed input on both sides and not move transfer device 24 in the first or second directions 42, 44. Gearing 58,60 may be separate from differential gear assembly 54 (as shown), connected to it, or internal to it, as can be implemented by one skilled in the art.

With either the motor-based solution or the gear-based solution above, the ratio of the active conveyor widths of the infeed and outfeed conveyors 20, 22 can be accounted for in the algorithm or gearing ratios used. Thus, in the example above, if the width ratio is 3:1 (infeed:outfeed) then the steady state ratio can be 1:3. Further, the speed of the transfer device can also be accounted for by knowing the conveyor widths, actual speed of the infeed and outfeed conveyors, and the steady state speed ratios. Active conveyor widths are determined based on flow along the conveyors are influenced by side rails, guides, dividers, etc., as it may not be desirable to use the entire width of a conveyor to transmit articles. See for example, divider 62 on transfer device 24, which keeps flow maintains flow in opposing directions from colliding or interfering. If desired, a powered belt 64 driven by a motor 66 on transfer device 24 may also be provided to assist in moving articles from infeed conveyor 20 to outfeed conveyor 22. Use of powered belt 64 reduces overall article pressure in device 10, reduces bridging of articles between infeed and outfeed conveyors, reduces the size of divider 62 required (allowing for greater density of articles per linear foot), and reduces the size of the transfer device required to move articles from infeed side to outfeed side.

Figure 3:
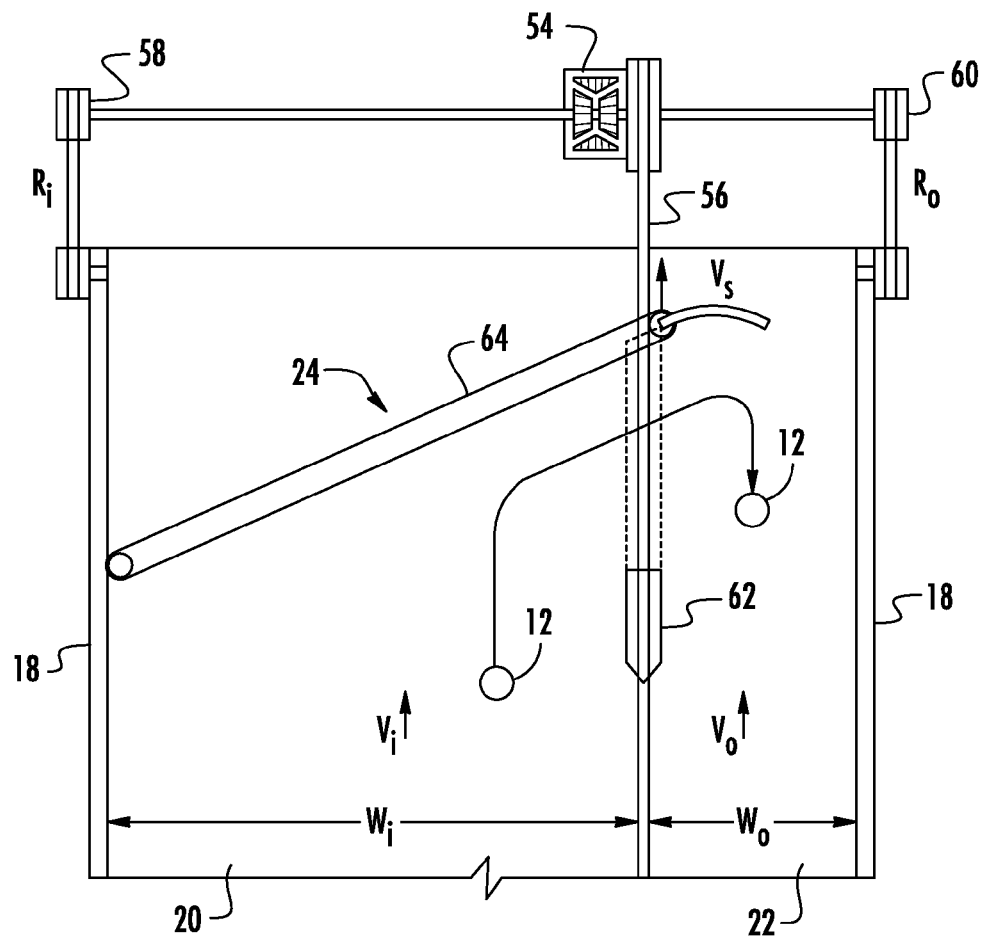
FIG. 3 is a diagrammatical view of a transfer device and conveyors of the device of FIG. 1 for purposes of illustrating speed relationships with reference to a differential gear assembly embodiment.
Figure 4:
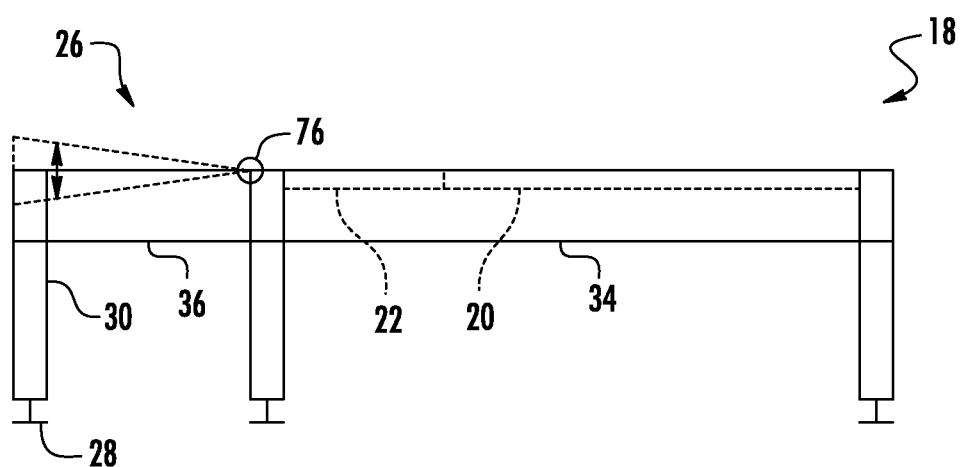
FIG. 4 is a diagrammatical end view of the device as in FIG. 1 showing a pivotable frame portion.

Thus, formula for the speed of transfer device 24 may be determined based on the following three formulae, with reference to FIG. 3:

$$Vs=(ViRi+VoRo)/2 \qquad (a)$$

$$Ri=2Wi/(Wi+Wo) \qquad (b)$$

$$Ro=2Wo/(Wi+Wo) \qquad (c)$$

Where:
Vs=Transfer device velocity
Vi=Infeed conveyor velocity
Vo=Outfeed conveyor velocity
Ri=Ratio of infeed intermediate gearing
Ro=Ratio of outfeed intermediate gearing
Wi=Active width of infeed conveyor
Wo=Active width of outfeed conveyor Drive control signals for motor 52 can be determined similarly, except that speed alterations caused by mechanical gearing 54, 58 and 60 is essentially replaced by equivalent calculations within controller 50, and an resulting control signal is provided to the motor.

Single-filing device 26 is supported by the frame 18 and includes a plurality of parallel endless loop conveyors (generally 68, specifically 68a-68n), including a first conveyor 68a adjacent outfeed conveyor 22 and an exit conveyor 68n furthest from the outfeed conveyor. Endless loop conveyors 68 are each drivable at a speed, with first conveyor 68a being drivable at a speed higher than a speed of outfeed conveyor 22, and with each endless loop conveyor 68b-68n laterally outward of the first endless loop conveyor 68a being drivable at a speed higher than a speed of the endless loop conveyor immediately laterally inward. In other words, the speeds of the endless loop conveyors 68a-68n in the single-filing device 26 increase in a direction away from outfeed conveyor 22, with speeds based on the speed of the outfeed conveyor. Single-filing device 26 includes at least two endless loop 68a and 68n, but may include further loops to assist in accelerating and thinning the flow received from outfeed conveyor 22. Thus, four, five, seven or ten loops may be employed, if desired.

Endless loop conveyors 68 each have an upstream end 70 located laterally from and between the upstream and downstream ends 38, 40 of infeed conveyor 20. In operation, single filing device 26 receives a mass flow of articles from outfeed conveyor 22 and convert the mass flow to a single-file flow of articles on the exit conveyor 68n for return to the system.

By locating upstream ends 70 of endless loop conveyors 68 essentially within the footprint of the upstream/downstream ends 38/40 of infeed conveyor 20 and supported by frame 18, a unitary and particularly compact design is provided. Further such design achieves benefits of both mass-flow type/horizontal devices and single file/vertical devices, in a layout that in certain ways has advantages of both designs without potential drawbacks for certain applications.

By integrating single-filing device 26 into infeed/outfeed conveyor frame 18, single filing device can start receiving articles well within the length of the infeed conveyor, thereby saving floor space as compared to conventional mass flow accumulators having conventional single-filing devices located somewhere downstream on a separate frame. Further, by using an infeed conveyor wider than the outfeed conveyor, the outfeed conveyor can be run more quickly, thereby assisting in the accelerating and thinning of the flow, further allowing for a more efficient use of floorspace.

By using endless loops of increasing speed 68a-68n, the mass flow on outfeed conveyor 22 is thinned to a single-file flow and moved progressively faster as the flow moves toward exit conveyor 68n. If each loop 68a-68n moves about 10% faster than its adjacent loop, then in the range of 7 loops, the linear speed will roughly double.

To achieve such differing speed, one or more drive motors 72 can be provided. If desired, one such motor may be provided for each loop 68. Alternatively, one motor may be provided to drive all loops with appropriate gearing between the motor output and the drive of each lop. Alternatively, if desired more than one motor, but less than one motor per loop, may be used (for example, each motor may drive two or three loops with appropriate gearing). Any such arrangement is acceptable according to the present disclosure.

If desired, frame 18 may include a first portion 34 that supports the infeed and outfeed conveyors 20, 22 and transfer device 24, and a second portion 36 that supports single filing device 26. Second portion 36 may be pivotable upward or downward relative to first portion 34 along axis 74 via hinges 76. Certain feet 28 and/or uprights 30 may also be adjustable to assist in such pivoting. The amount of pivoting may be in the range of about ±10 degrees from the horizontal, but may be less, such as about ±5 degrees from the horizontal (see FIG. 4). Such pivoting can be beneficial in assisting in differentiating the flow into a single-file flow. Some shapes of articles form a single file better with an upward travel (i.e., an upward pivot of section 36), and some shapes form a single file better with a downward travel (i.e., a downward pivot). Providing an upward and downward pivot ability for frame 18 allows device 10 to handle either type of article. A guide 78, which may be a rail, plate or the like, may be provided between the outfeed conveyor 22 and single-fling device 26 to assist in urging articles outward as the move toward outermost endless loop 68n.

It should be appreciated by those skilled in the art that various modifications and variations can be made in the present disclosure without departing from the scope and spirit of the disclosure. It is intended that the present disclosure include such modifications and variations as come within the scope of the appended claims and their equivalents.

We claim:

1. A device for accumulating articles within a system, comprising:
   a frame;
   an infeed conveyor supported by the frame for receiving articles from the system, the infeed conveyor being a mass-flow conveyor drivable in a first direction;
   an outfeed conveyor supported by the frame for receiving articles from the infeed conveyor and returning the articles to the system, the outfeed conveyor being a mass-flow conveyor drivable in a second direction opposite the first direction, wherein when the device is in a steady state condition, the outfeed conveyor is driven faster than the infeed conveyor with the ratio of a speed of the outfeed conveyor to a speed of the infeed conveyor speed being substantially equal to the ratio of a width of the infeed conveyor to a width of the outfeed conveyor;
   a transfer device supported by the frame for transferring articles from the infeed conveyor to the outfeed conveyor, the transfer device moveable along the infeed and outfeed conveyors depending on flow through the system; and
   at least two endless loops mounted in parallel to each other and to the outfeed conveyor on the frame and drivable independently, an outermost one of the endless loops furthest from the infeed conveyor being drivable at a speed higher than any other of the endless loops so that the outermost endless loop returns articles to the system in single file orientation.

2. The device of claim 1, wherein the infeed conveyor has a width greater than a width of the outfeed conveyor.

3. The device of claim 1, wherein the transfer device is movable via a motor.

4. The device of claim 1, wherein the transfer device is movable via output of a differential gearbox having inputs related to the speeds of the infeed conveyor and the outfeed conveyor.

5. The device of claim 1, wherein the device includes at least four of the endless loops.

6. The device of claim 5, wherein each of the endless loops is drivable with a respective speed that increases in a direction from an innermost one of the endless loops to the outermost endless loop.

7. The device of claim 6, wherein the innermost endless loop is drivable at a speed that is higher than a speed of the outfeed conveyor.

8. The device of claim 7, wherein each given endless loop outward of the innermost endless loop is drivable at a speed that is about 10% higher than a speed of the endless loop immediately inward of the given endless loop.

9. The device of claim 1, further including a guide member attached to the frame for guiding articles from the outfeed conveyor toward the endless loops.

10. The device of claim 1, wherein the outermost endless loop is drivable at a speed that is about twice that of a speed of the outfeed conveyor.

11. The device of claim 1, wherein a first portion of the frame supporting the endless loops is pivotable along an axis extending along the endless loops relative to a second portion of the frame supporting the outfeed conveyor so as to pivot upper surfaces of the endless loops from the horizontal around the axis.

12. The device of claim 1, wherein the infeed conveyor has an upstream end and a downstream end, each of the endless loops having a respective upstream end located laterally from and between the upstream and downstream ends of the infeed conveyor.

13. A device for accumulating articles within a system, comprising:
   a frame;
   an infeed conveyor supported by the frame for receiving articles from the system, the infeed conveyor being a mass-flow conveyor having an upstream end and a downstream end and being drivable in a first direction;
   an outfeed conveyor supported by the frame for receiving articles from the infeed conveyor and returning the articles to the system, the outfeed conveyor being a mass-flow conveyor drivable in a second direction opposite the first direction, wherein the infeed conveyor has a width greater than a width of the outfeed conveyor and in a steady state condition the ratio of the outfeed conveyor speed to the infeed conveyor speed is substantially equal to the ratio of the infeed conveyor width to the outfeed conveyor width;
   a transfer device supported by the frame for transferring articles from the infeed conveyor to the outfeed conveyor; and
   a single-filing device supported by the frame and including a plurality of parallel endless loop conveyors including a first conveyor adjacent the outfeed conveyor and an exit conveyor furthest from the outfeed conveyor, the endless loop conveyors each being drivable at a speed, the first conveyor being drivable at a speed higher than a speed of the outfeed conveyor, each endless loop conveyor laterally outward of the first conveyor being drivable at a speed higher than a speed of the endless loop conveyor immediately laterally inward, the endless loop conveyors each having an upstream end located laterally from and between the upstream and downstream ends of the infeed conveyor, the single filing device receiving a mass flow of articles from the outfeed conveyor and converting the mass flow to a single-file flow of articles on the exit conveyor for return to the system.

14. The device of claim 13, wherein the transfer device is movable along the infeed and outfeed conveyors depending on a variation in flow of articles through the system.

15. The device of claim 13, wherein the device includes at least four of the endless loops, and each of the endless loops is drivable with a respective speed that increases in a direction from an innermost one of the endless loops to the outermost endless loop.

16. The device of claim 15, wherein each given endless loop outward of the innermost endless loop is drivable at a speed that is about 10% higher than a speed of the endless loop immediately inward of the given endless loop.

17. The device of claim 13, further including a guide member attached to the frame for guiding articles from the outfeed conveyor toward the endless loops.

18. The device of claim 13, wherein a first portion of the frame supporting the endless loop conveyors is pivotable along an axis extending along the endless loop conveyors relative to a second portion of the frame supporting the outfeed conveyor so as to pivot upper surfaces of the endless loop conveyors from the horizontal around the axis.

19. A device for accumulating articles within a system, comprising:
   a frame;
   an infeed conveyor supported by the frame for receiving articles from the system, the infeed conveyor being a mass-flow conveyor drivable in a first direction;
   an outfeed conveyor supported by the frame for receiving articles from the infeed conveyor and returning the articles to the system, the outfeed conveyor being a mass-flow conveyor drivable in a second direction opposite the first direction;
   a transfer device supported by the frame for transferring articles from the infeed conveyor to the outfeed conveyor, the transfer device moveable along the infeed and outfeed conveyors depending on flow through the system, wherein the transfer device is movable via output of a differential gearbox having inputs related to the speeds of the infeed conveyor and the outfeed conveyor; and
   at least two endless loops mounted in parallel to each other and to the outfeed conveyor on the frame and drivable independently, an outermost one of the endless loops furthest from the infeed conveyor being drivable at a speed higher than any other of the endless loops so that the outermost endless loop returns articles to the system in single file orientation.

20. The device of claim 19, wherein a first portion of the frame supporting the endless loops is pivotable along an axis extending along the endless loops relative to a second portion of the frame supporting the outfeed conveyor so as to pivot upper surfaces of the endless loops from the horizontal around the axis.

21. The device of claim 20, wherein the infeed conveyor has an upstream end and a downstream end, each of the endless loops having a respective upstream end located laterally from and between the upstream and downstream ends of the infeed conveyor.

22. A device for accumulating articles within a system, comprising:
   a frame;
   an infeed conveyor supported by the frame for receiving articles from the system, the infeed conveyor being a mass-flow conveyor drivable in a first direction;
   an outfeed conveyor supported by the frame for receiving articles from the infeed conveyor and returning the articles to the system, the outfeed conveyor being a mass-flow conveyor drivable in a second direction opposite the first direction;
   a transfer device supported by the frame for transferring articles from the infeed conveyor to the outfeed conveyor, the transfer device moveable along the infeed and outfeed conveyors depending on flow through the system; and at least two endless loops mounted in parallel to each other and to the outfeed conveyor on the frame and drivable independently, an outermost one of the endless loops furthest from the infeed conveyor being drivable at a speed higher than any other of the endless loops so that the outermost endless loop returns articles to the system in single file orientation, wherein a first portion of the frame supporting the endless loops is pivotable along an axis extending along the endless loops relative to a second portion of the frame supporting the outfeed conveyor so as to pivot upper surfaces of the endless loops from the horizontal around the axis.

23. The device of claim 22, wherein the infeed conveyor has an upstream end and a downstream end, each of the endless loops having a respective upstream end located laterally from and between the upstream and downstream ends of the infeed conveyor.

24. The device of claim 22, wherein the device includes at least four of the endless loops, each of the endless loops being drivable with a respective speed that increases in a direction from an innermost one of the endless loops to the outermost endless loop.

25. The device of claim 24, wherein the innermost endless loop is drivable at a speed that is higher than a speed of the outfeed conveyor, each given endless loop outward of the innermost endless loop being drivable at a speed that is about 10% higher than a speed of the endless loop immediately inward of the given endless loop.

26. A device for accumulating articles within a system, comprising:

a frame;

an infeed conveyor supported by the frame for receiving articles from the system, the infeed conveyor being a mass-flow conveyor having an upstream end and a downstream end and being drivable in a first direction;

an outfeed conveyor supported by the frame for receiving articles from the infeed conveyor and returning the articles to the system, the outfeed conveyor being a mass-flow conveyor drivable in a second direction opposite the first direction;

a transfer device supported by the frame for transferring articles from the infeed conveyor to the outfeed conveyor; and a single-filing device supported by the frame and including a plurality of parallel endless loop conveyors including a first conveyor adjacent the outfeed conveyor and an exit conveyor furthest from the outfeed conveyor, the endless loop conveyors each being drivable at a speed, the first conveyor being drivable at a speed higher than a speed of the outfeed conveyor, each endless loop conveyor laterally outward of the first conveyor being drivable at a speed higher than a speed of the endless loop conveyor immediately laterally inward, the endless loop conveyors each having an upstream end located laterally from and between the upstream and downstream ends of the infeed conveyor, the single filing device receiving a mass flow of articles from the outfeed conveyor and converting the mass flow to a single-file flow of articles on the exit conveyor for return to the system, wherein a first portion of the frame supporting the single-filing device is pivotable along an axis extending along the endless loop conveyors relative to a second portion of the frame supporting the outfeed conveyor so as to pivot upper surfaces of the endless loop conveyors from the horizontal around the axis.

27. The device of claim 26 wherein the device is in a steady state condition, the outfeed conveyor is driven faster than the infeed conveyor with a ratio of a speed of the outfeed conveyor to a speed of the infeed conveyor speed substantially equal to the ratio of a width of the infeed conveyor to a width of the outfeed conveyor, the transfer device being movable via output of a differential gearbox having inputs related to the speeds of the infeed conveyor and the outfeed conveyor.

* * * * *